US005699988A

United States Patent [19]

Boettger et al.

[11] Patent Number: 5,699,988

[45] Date of Patent: Dec. 23, 1997

[54] COUPLER CLAMPING APPARATUS FOR INTERCONNECTING A FREE-STANDING, WHEELED INTRAVENOUS POLE WITH MOBILE PATIENT TRANSFER DEVICES

[75] Inventors: Conrad H. Boettger, Hesston; Bill J. Hawks, Jr., Wichita, both of Kans.

[73] Assignee: St. Francis Research Institute, Wichita, Kans.

[21] Appl. No.: 324,026

[22] Filed: Oct. 14, 1994

Related U.S. Application Data

[63] Continuation-in-part of Ser. No. 5,825, Jan. 19, 1993, Pat. No. 5,355,539.

[51] Int. Cl.[6] .......... F16L 3/00

[52] U.S. Cl. .......... 248/122.1; 5/658; 248/124.1; 248/276.1; 248/316.1; 297/188.01; 297/188.2

[58] Field of Search .......... 248/104, 122.1, 248/124.1, 160, 316.1, 224.7, 276.1, 121; 297/188.01, 188.06, 188.12, 188.2; 5/658, 503.1; 403/DIG. 4, 325

[56] References Cited

U.S. PATENT DOCUMENTS

| | | | |
|---|---|---|---|
| D. 287,055 | 12/1986 | Fick et al. | D24/128 |
| 937,480 | 10/1909 | Smith et al. | 248/287 X |
| 2,416,812 | 3/1947 | Bailey | 248/104 |
| 2,597,670 | 5/1952 | Pinto | 248/122.1 X |
| 4,511,157 | 4/1985 | Wilt, Jr. | 297/188.2 X |
| 4,511,158 | 4/1985 | Varga et al. | 297/188.2 X |
| 4,547,092 | 10/1985 | Vetter et al. | 403/59 |
| 4,572,536 | 2/1986 | Doughty | 297/188.2 X |
| 4,600,209 | 7/1986 | Kerr, Jr. | 5/503.1 X |
| 4,676,687 | 6/1987 | Koffler | 403/384 |
| 4,729,576 | 3/1988 | Roach | 5/658 |
| 4,767,131 | 8/1988 | Springer et al. | 297/188.2 X |
| 4,813,810 | 3/1989 | Suzuki | 403/325 X |
| 4,945,592 | 8/1990 | Sims et al. | 5/658 |
| 5,135,191 | 8/1992 | Schmuhl | 5/658 |
| 5,149,036 | 9/1992 | Sheehan | 5/658 |
| 5,322,253 | 6/1994 | Stevens | 248/125.1 X |
| 5,366,191 | 11/1994 | Bekanich | 248/125.1 |

*Primary Examiner*—Ramon O. Ramirez
*Assistant Examiner*—Derek J. Berger
*Attorney, Agent, or Firm*—Shook, Hardy & Bacon L.L.P.

[57] ABSTRACT

A coupler clamping assembly (10) is provided for releasably connecting a mobile support stand (52) with a patient transport device such as a gurney (54), in order to allow patient transfer with the support stand while eliminating the need for extra transport personnel. The clamp (10) preferably includes a pair of opposed, laterally spaced apart jaws (20, 22) interconnected by a central bight section (24). A connector assembly including a pair of oppositely extending elongated connection elements (14, 16) is supported on the body for relative pivotal movement, and the connection elements are received for rotation in a tubular section (66) conventionally provided as a part of the gurney (54). A clamping screw (18) is threaded for receipt in a threaded opening through one of the jaws (20) and cooperates with the opposed jaw (22) for securely clamping the upright standard (60) of the pole unit (52) within the clamping assembly (10). An arm assembly is also provided for permitting releasable interconnection between a mobile support stand and any type of patient transfer device. The arm may be fixed to the stand or transfer device, and includes an attachment clamp or coupling for releasably interconnecting the stand and transfer device.

7 Claims, 3 Drawing Sheets

Fig.2.
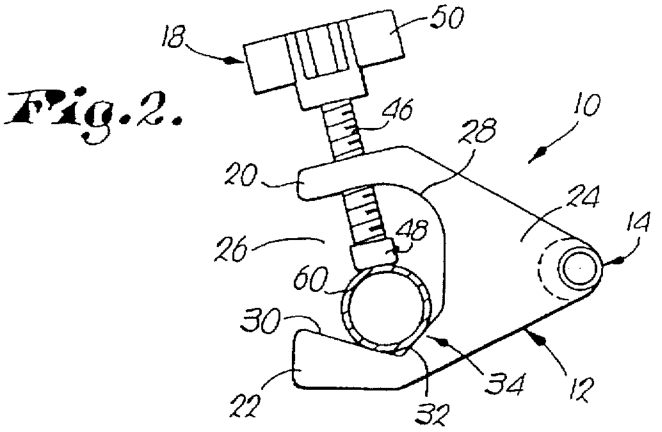
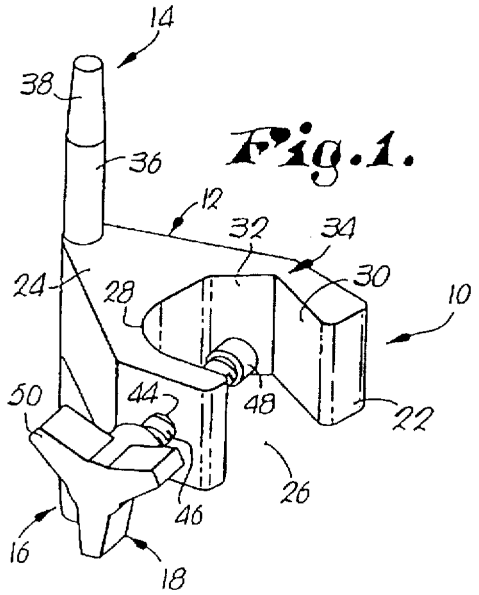
Fig.1.
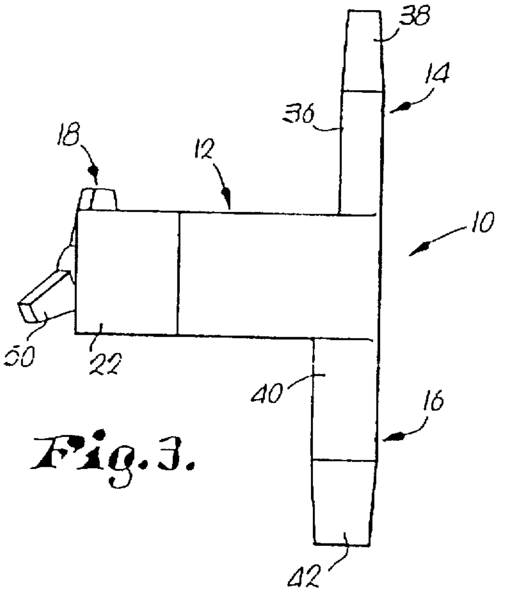
Fig.3.
Fig.4.
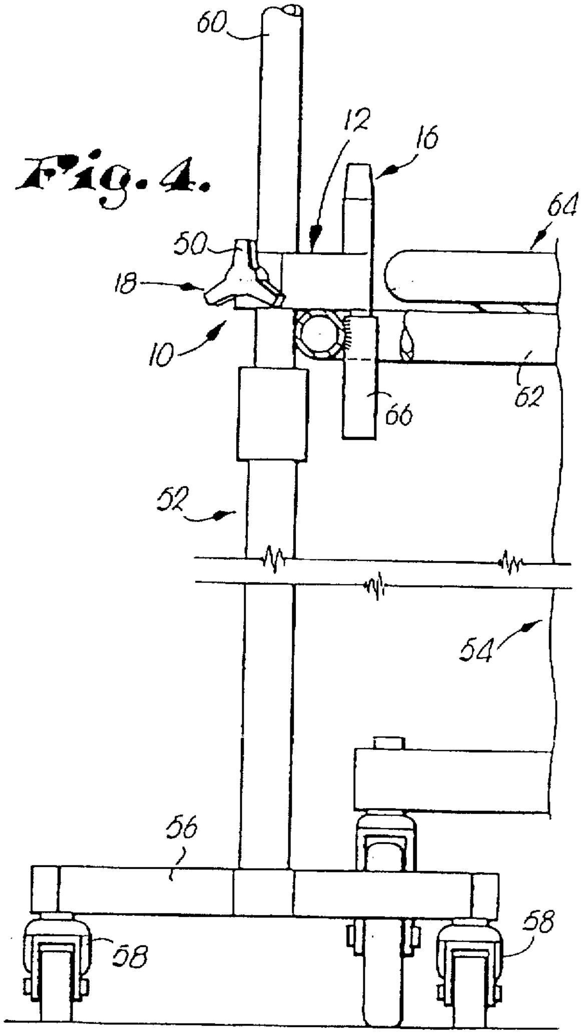

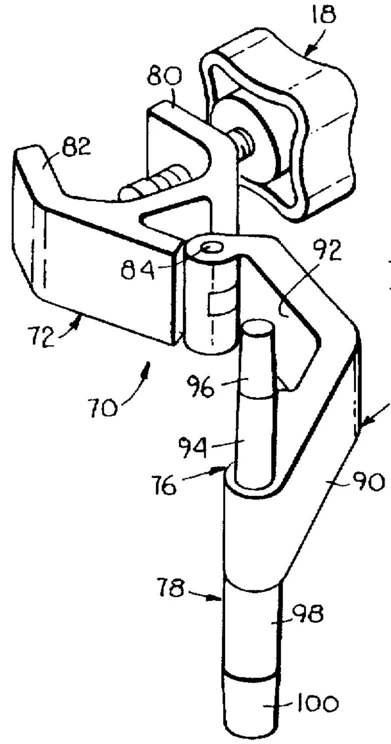
Fig. 6.
Fig. 5.
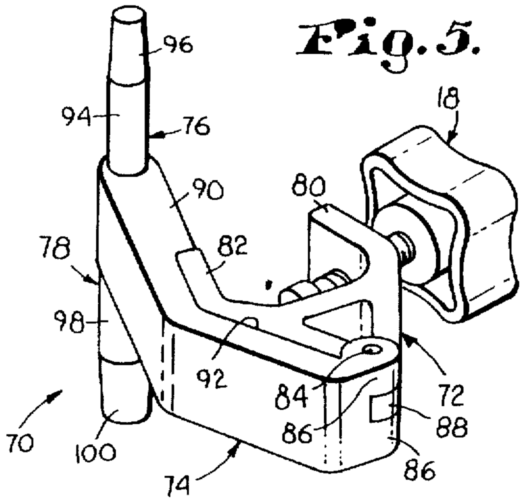
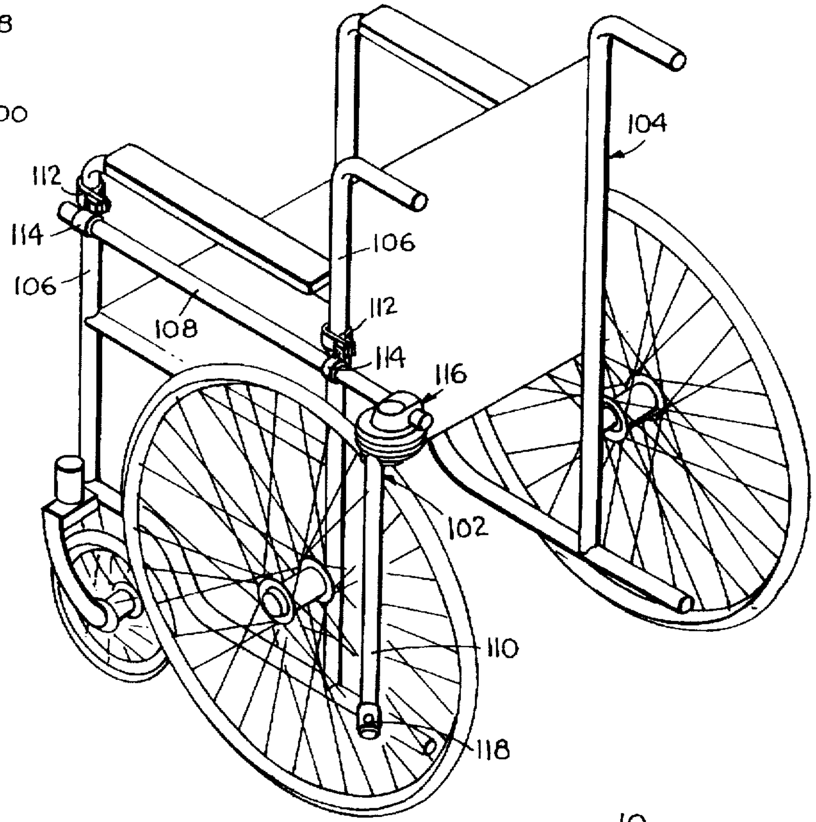
Fig. 7.
Fig. 9.
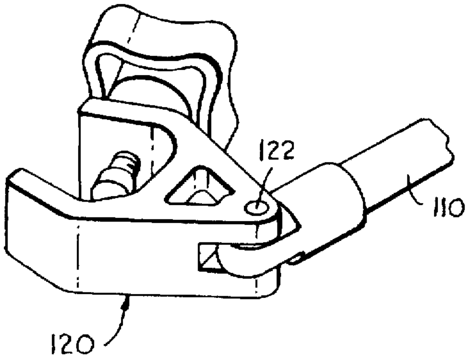
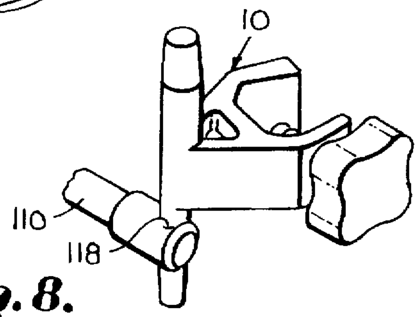
Fig. 8.

COUPLER CLAMPING APPARATUS FOR INTERCONNECTING A FREE-STANDING, WHEELED INTRAVENOUS POLE WITH MOBILE PATIENT TRANSFER DEVICES

RELATED APPLICATIONS

The present application is a Continuation-In-Part of application Ser. No. 08/005,825, filed 19 Jan. 1993 by Boettger now U.S. Pat. No. 5,355,539.

BACKGROUND OF THE INVENTION

1. Field of the Invention

The present invention is broadly concerned with an improved releasable coupler clamping apparatus adapted for connecting a mobile, free standing support stand (e.g., a wheeled stand for supporting intravenous fluids and related equipment) to a mobile patient transfer device such as a gurney, bed or wheelchair in such manner as to securely couple the support stand and permit movement of the transfer device and stand in unison by a single attendant.

2. Description of the Prior Art

One of the most common tasks in a hospital is that of transporting sitting or recumbent patients between wards or to various locations in the hospital. In many cases, such patients are undergoing continuous intravenous fluid therapy, and it is important to transfer the IV assembly along with the patient, in order to eliminate the necessity of terminating the IV infusion during transport. Typical IV assemblies include a free standing, wheeled support stand having a castered base with an upright standard, the latter having one or more limbs adjacent the upper end thereof.

One response to this problem is to use two attendants for the patient transfer, one to push and guide the patient transfer device (e.g., a gurney, mobile bed or wheelchair), while the other attendant pushes and guides the IV assembly. Obviously, this is a costly approach, and is extremely inefficient from the standpoint of manpower utilization.

SUMMARY OF THE INVENTION

The present invention overcomes the problems outlined above, and provides a coupler clamping apparatus for permitting releasable interconnection for a mobile transfer device and a separate mobile support stand, with the connection permitting the stand to be pulled along with the transport device without the need of an extra attendant.

Broadly speaking, the clamping apparatus of the invention includes a body presenting a pair of spaced apart jaws cooperatively defining a recessed area and configured for receiving the standard, and a connector assembly supported on the body for pivotal movement relative to the body about a pivot axis extending in a direction transverse to the jaws. The connector assembly includes a connector element extending in a direction transverse to the jaws, and adapted for rotatable receipt in the tubular section of the transfer device to permit relative pivoting movement between the transfer device and connector assembly. The clamp also includes a releasable means for maintaining the standard within the recessed area.

In preferred forms, the connection elements are in the form of oppositely extending members each presenting a cylindrical shank portion with a tapered end remote from the clamp body. These elements are moreover configured with shanks of different relative diameters, so as to permit the clamp assembly to be used with different sizes of tubular adapters. At the same time, insertion of a connector element within the tubular adapter of a patient transport device allows the coupled support stand to freely pivot during transport to thereby follow the patient transfer device without the need for an attendant.

By providing a construction in accordance with the invention, numerous advantages are achieved. For example, by providing a clamp that includes a connector element and body that are connected together for relative pivotal movement, it is possible to allow transfer devices and support stands of varying construction to be temporarily interconnected for transportation together as a single unit.

An extendable arm assembly is also preferably provided for permitting releasable interconnection of a mobile patient transfer device and a separate support stand. The arm assembly includes first and second elongated arms connected together for relative pivotal movement about an axis extending in a direction transverse to the arms, and the second arm presents a distal end remote from the pivot axis. An attachment means is provided for attaching the first arm to the pair of upstanding frame elements of the transfer device so that during relative pivoting movement of the arms, the first arm remains fixed on the transfer device. The second arm includes a coupling means at the distal end for coupling the support stand to the second arm for pivotal movement relative to the second arm.

The arm assembly permits additional versatility of the clamp discussed above, and permits releasable interconnection between a transfer device and a support stand so that the two may be transported together as a unit. In addition, the assembly may be easily stored when not in use, and quickly adjusts to any of an infinite number of use positions.

The arm assembly may alternately include an articulating arm having first and second axial ends that are movable relative to one another in any direction, a clamp that is attached to the arm and includes a pair of spaced apart jaws cooperatively defining a recessed area for receiving the standard and a means for releasably maintaining the standard within the recessed area, and an attachment means for attaching the second end of the articulating arm to the frame element of the transfer device. The attachment means includes a first attachment element secured to the frame element of the transfer device and a second attachment element secured to the second end of the articulating arm, the first and second attachment elements being detachable from one another to permit removal of the arm and coupling means from the transfer device.

BRIEF DESCRIPTION OF THE DRAWINGS

A preferred embodiment of the present invention is described in detail below with reference to the attached drawing figures, wherein:

FIG. 1 is a perspective view of a clamp constructed in accordance with a first construction of the preferred embodiment;

FIG. 2 is a plan view of the clamp, shown as it would appear when used to clamp an upright standard;

FIG. 3 is a side elevational view of the clamp;

FIG. 4 is a fragmentary end view illustrating the use of the clamp in securing a conventional wheeled IV support stand to a patient gurney;

FIG. 5 is a perspective view of a clamp constructed in accordance with a second construction of the preferred embodiment, illustrating a retracted position of the clamp body relative to a connector assembly, FIG. 6 is a perspective view of the clamp, illustrating an extended position of the clamp body relative to the connector assembly;

FIG. 7 is a perspective view of a wheelchair on which is mounted an extendable arm assembly constructed in accordance with the preferred embodiment;

FIG. 8 is a fragmentary perspective view of the arm assembly, illustrating a first construction of the assembly;

FIG. 9 is a fragmentary perspective view of the arm assembly, illustrating a second construction of the assembly.

DETAILED DESCRIPTION OF THE PREFERRED EMBODIMENTS

Figure 10:
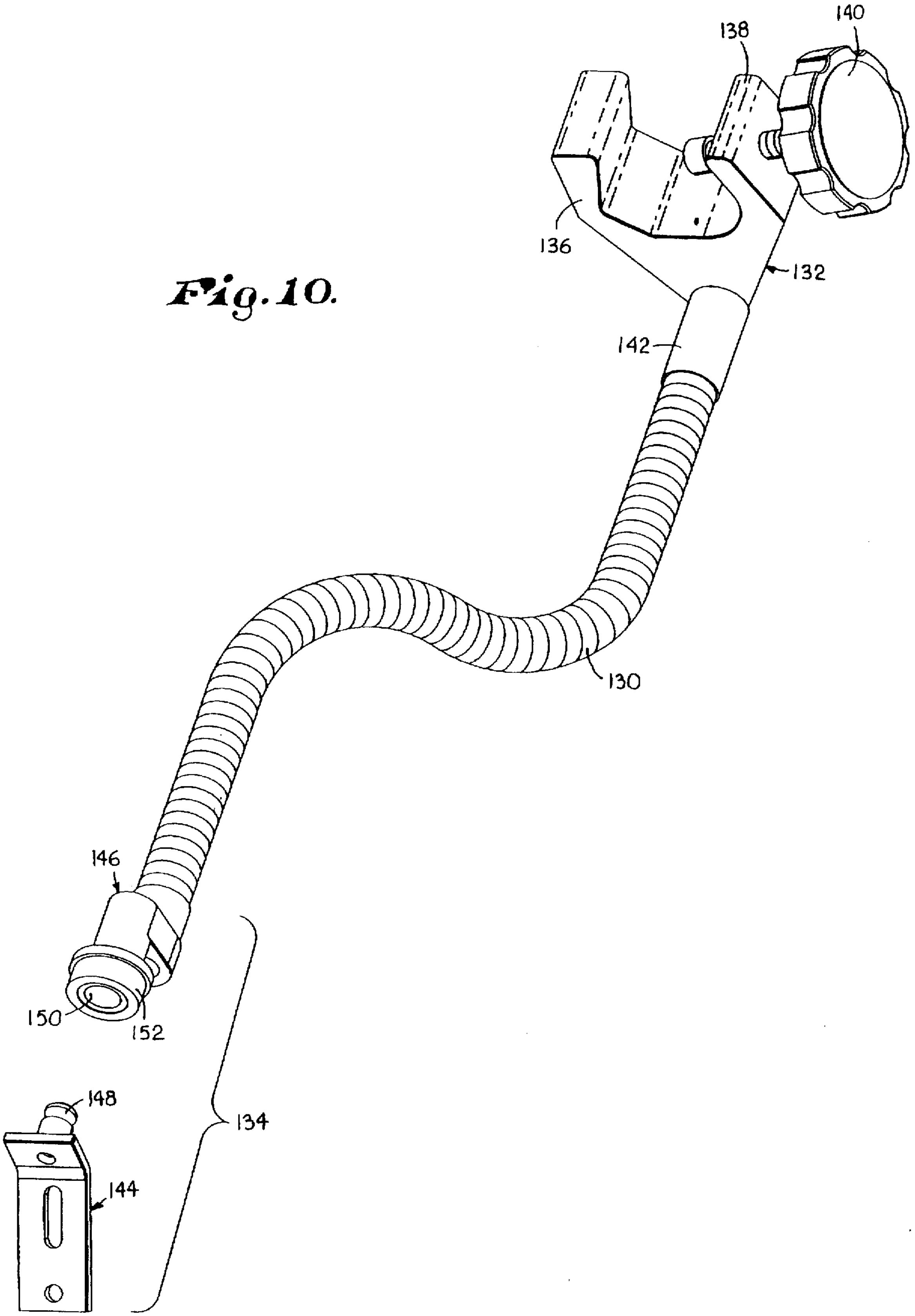
FIG. 10 is an exploded perspective view of another arm assembly constructed in accordance with the preferred embodiment.

Turning now to the drawings, and particularly FIGS. 1–3, a clamp 10 in accordance with a first construction of the preferred embodiment is illustrated. Broadly speaking, the clamp 10 includes a main body 12 together with a pair of oppositely extending, differently configured connector elements 14 and 16. In addition, the body 12 carries a threaded, axially rotatable clamping screw 18.

In more detail, the body 12 is preferably an integral unit and is configured to present a pair of opposed, laterally spaced apart jaws 20, 22 which are interconnected by a central bight section 24 of somewhat triangular configuration in plan. The jaws 20, 22 and bight section 24 cooperatively define a recessed area 26 as best seen in FIG. 2. The inner defining surface of jaw 20 is substantially planar and is curvilinear as at 28 at the transition between the jaw and the central bight section 24. On the other hand, the inner defining surface of opposed jaw 22 presents a pair of intersecting, generally planar surfaces 30, 32 which cooperatively present a generally V-shaped segment 34 at the inboard region of jaw 22.

Connection element 14 is located at the apex of the bight section 24 and presents a cylindrical shank portion 36 as well as a tapered outermost end 38 remote from the body 12. Likewise, it will be observed that the connection element 16 is mounted at the apex of the section 24, and includes a cylindrical shank portion 40 as well as a tapered outer end 42. As best illustrated in FIG. 3, the respective shank portions 36, 40 forming a part of the elements 14, 16 extend in opposite directions from the opposed upper and lower surfaces of the body 12. Moreover, these shank portions are of different diameters, i.e, the shank portion 36 has a smaller diameter than that of the opposed shank portion 40.

Clamping screw 18 is threaded for receipt in an appropriately threaded aperture 44 provided in jaw 20. As best illustrated in FIG. 2, the screw 18 includes an elongated threaded shank 46 with a resilient, cup-like cap 48 secured on the inner end thereof within recessed area 26. It will also be noted that the longitudinal axis of the shank 46 is substantially aligned with the apex of V-shaped segment 34, and is of a length to extend to a position very close to surfaces 30, 32. The outermost end of the shank 46 located outside of the recessed area 26 is equipped with a handle 50 allowing easy manipulation of the clamping screw.

FIG. 4 illustrates the use of clamp 10 for connecting a free standing IV pole unit 52 to a conventional patient gurney 54. The pole unit 52 includes a relatively wide base 56 provided with caster wheels 58, as well as an elongated, upstanding, two-piece telescopically interfitted standard 60. Although not shown, those skilled in the art will appreciate that appropriate limbs or other structure is provided at the upper end of the standard 60 for supporting supplies of IV liquid or other equipment. Gurney 54 includes a frame assembly 62 as well as a patient bed 64. In addition, gurneys of this type are conventionally provided with upstanding, upwardly opening tubular sections adjacent the corners thereof, such as the section 66 illustrated.

In the use of clamp 10, one of the connection elements 14 or 16 is inserted into a convenient tubular section 66 in such manner as to allow free pivoting of the clamping assembly therein. At this point, the pole unit 52 is wheeled to a position adjacent the clamping assembly, and is moved so that the standard 60 thereof is positioned within recessed area 26, and specifically adjacent the planar surfaces 30, 32. In order to complete the connection, it is only necessary to manipulate handle 50 in order to tighten the inner end of the clamping screw against the standard 60, thereby firmly clamping the latter between the clamping screw and the V-shaped segment 34. In this orientation, the gurney 54 can be conventionally moved and guided, with the pole unit 52 being securely attached and following the gurney, all without the need for an extra attendant.

It will be appreciated in this respect that the interfit between the connection element 14 or 16 and the tubular section 66 allows the pole unit 52 to pivot about the axis of the connection element. Thus, the coupled pole unit can easily negotiate turns with the gurney 54, while remaining completely stable. Use of differently sized connection elements 14, 16 allows the clamping assembly to be universally employed on virtually all commonly used patient transport devices, such as gurneys, wheelchairs or hospital beds.

Turning to FIG. 5, a clamp in accordance with a second construction of the preferred embodiment is shown. Broadly speaking, the clamp 70 includes a main body 72 and a connector assembly 74 presenting a pair of oppositely extending, differently configured connector elements 76, 78. In addition, the body carries a threaded, axially rotatable clamping screw 18 identical to the clamping screw described above with reference to the first construction of the preferred embodiment.

In more detail, the body 72 is preferably an integral unit and is configured to present a pair of opposed, laterally spaced apart jaws 80, 82 which are interconnected by a central bight section of somewhat triangular configuration in plan. As with the clamp 10 described above, the inner defining surface of the jaw 80 is substantially planar and is curvilinear as at the transition between the jaw and the central bight section. The inner defining surface of the opposed jaw 82 presents a pair of intersecting, generally planar surfaces which cooperatively present a generally V-shaped segment profile at the inboard surface of the jaw 82.

The connector assembly 74 is supported on the body for pivotal movement relative to the body about a pivot axis defined by a pivot pin 84. The pivot pin extends in a direction transverse to the jaws 80, 82, and extends through holes in the connector assembly. Preferably, the connector assembly presents a pair of spaced ears 86 in which the holes are formed, and the body presents a single ear 88 that is received between the ears of the connector assembly. The pivot pin 84 supports the connector assembly on the body and allows the body to be moved relative to the connector assembly between a retracted position, shown in FIG. 5, and an extended position shown in FIG. 6.

The connector assembly includes an elongated arm 90 that extends in a direction parallel to the jaws of the body, and the connector elements 76, 78 extend in opposite directions from the arm along a line transverse to the jaws 80, 82. The arm 90 is angled to define an elbow between the pivot pin 84 and the connector elements 76, 78. The inside of the elbow is shaped to define a recess 92 within which the jaw 82 is received when the body and connector assembly are in the position shown in FIG. 5. If desired, the recess 92 may be sized to provide a snap-fit between the body and connector assembly to hold the body and connector assembly together until a predetermined physical force is applied to pull the body from the recess.

The connector element 76 presents a transverse cylindrical shank portion 94 as well as a tapered outermost end 96 remote from the arm. Likewise, the connector element 78 includes a cylindrical shank portion 98 as well as a tapered outer end 100. As best illustrated in FIG. 6, the respective shank portions 94, 98 are of different diameters, i.e, the shank portion 94 has a smaller diameter than that of the opposed shank portion 98.

An extendable arm assembly 102 constructed in accordance with the preferred embodiment is shown in FIG. 7, and is adapted for attachment to a wheelchair 104 or other transfer device that is typically provided with vertical upstanding frame members 106. The arm assembly includes first and second elongated arms 108, 110, each formed of a single piece of rigid cylindrical or tubular material.

An attachment means is provided for attaching the first arm 108 to the upstanding frame elements 106 of the wheelchair so that during relative pivoting movement of the arms 108, 110, the first arm remains fixed on the transfer device. The attachment means preferably includes a first pair of ring clamps 112 secured to the frame members 106, and a second pair of ring clamps 114 secured to the first arm 108. The ring clamps 112, 114 are provided with holes that may be aligned to permit each clamp 112 to be screwed together with one of the clamps 114 to hold the arm against the frame.

The second arm 110 is connected to one end of the first arm by a mounting assembly 116 which permits selective pivotal movement of the second arm relative to the first arm. Preferably, the mounting assembly 116 includes a lock that prevents the arms from pivoting relative to one another unless desired, and is movable to an unlocked position in which the second arm 110 may be pivoted through an infinite number of positions relative to the wheelchair.

The second arm 110 presents a distal end remote from the mounting assembly, and includes a coupling means at the distal end for coupling a support stand to the second arm for pivotal movement relative to the second arm. In this manner, two separate pivotal connections are provided between the wheelchair and the support stand, allowing them to be releasably interconnected in any of several orientations.

Two preferred forms of the coupling means are shown in FIGS. 8 and 9. Turning first to the construction illustrated in FIGS. 7 and 8, the second arm 110 is shown as including an upstanding, upwardly opening receptacle 118 in the distal end of the arm 110. The receptacle is sized to receive one of the connector elements 76, 78 of a clamp 10 as described above, and permits rotation of the connector element when the clamp is mounted on the arm assembly. Thus, not only is the second arm of the assembly 102 pivotal relative to the wheelchair, but the clamp may be pivoted within the receptacle 118 to permit the support stand to be properly oriented relative to the wheelchair for transportation.

Alternately, as shown in FIG. 9, the arm assembly 102 and clamp 120 may be combined into a single, unitary device in which the clamp is connected to the distal end of the second arm by a pivot pin 122 which permits relative pivotal movement between the arm and clamp.

An articulating arm assembly constructed in accordance with another aspect of the preferred embodiment is illustrated in FIG. 10, and is adapted for attachment to a wheelchair, bed or other transfer device that is provided with a frame element to which the assembly may be affixed. The arm assembly includes an articulating arm 130, a clamp 132 for coupling the arm to a support stand having a wheeled base and an upright standard, and an attachment means 134 for attaching the arm to the frame element of the transfer device.

The articulating arm 130 is a semi-rigid, adjustable goose neck or flex arm of known construction presenting first and second axial ends that are movable relative to one another in any direction within all three dimensions of movement. Similar goose neck or flex arm designs are commonly found in microphone stands and the like, and typically include a pair of helical strips of metal that are interconnected with one another to permit relative shifting movement between the strips along the length of the sleeve defined by the strips.

The clamp 132 is substantially identical in most respects to the clamp 10 described above, and defines a coupling means for coupling a support stand to the first end of the articulating arm. The clamp 132 includes a pair of spaced apart jaws 136, 138 cooperatively defining a recessed area for receiving the standard of the support stand, and a threaded, axially rotatable clamping screw 140. In addition, the clamp includes a cylindrical sleeve 142 extending in a direction parallel to the direction in which the standard is supported in the clamp during use, and this sleeve is sized to receive the first end of the articulating arm 130 to permit the clamp to be securely fastened to the arm.

Alternately, the clamp may include a collar that is carried on the support stand and fully encircles the standard. The collar may be rigidly afixed on the IV pole standard or base, or may be formed of a diameter larger than the diameter of the standard to permit shifting of the arm along the standard. A set screw or the like is then provided to secure the collar at a desired position. The collar may be formed of two parts that are held together by a bolt or the like so that the collar may be removed from the standard if necessary.

The attachment means 134 for attaching the second end of the articulating arm to the frame element of the transfer device includes a first attachment element 144 secured to the transfer device and a second attachment element secured to the second end of the articulating arm. The first attachment element 144 includes a generally L-shaped bracket having holes or slots for permitting the bracket to be fastened to the frame element by screw fasteners or the like. In addition, the bracket includes an upstanding male coupling member 148 having a circumferential groove formed between the axial ends thereof.

The second attachment element 146 is a female coupling member adapted to receive the male member 148 to retain the articulating arm on the transfer device. Preferably, the female member includes a receptacle 150, a radially shiftable locking piece, and an axially shiftable collar 152 that biases the locking piece radially into the groove of the male member when the two members are coupled together. The locking piece prevents the male member from being pulled from the female member inadvertently. However, when the collar 152 is shifted to release the locking piece, detachment of the female member is permitted.

When a support stand is to be pulled along by the mobile patient transfer device, the articulating arm assembly is connected to the device by coupling the male and female elements 144, 146 together. The first element is designed to be left on the transfer device at all times, while the articulating arm may be removed when desired.

With the arm 130 in place on the transfer device, the stand is positioned in the desired orientation relative to the device, and the arm is manipulated to position the spaced apart jaws 136, 138 around the upright standard of the support stand. Thereafter, the screw 140 is tightened against the standard so that the standard is retained within the jaws while being permitted to rotate about its axis relative to the clamp.

Once the support stand is secured in the clamp, movement of the transfer device is accompanied by movement of the stand, and it is not necessary to separately attend to moving the stand to keep it in proximity to the transfer device.

Although the present invention has been described with reference to the preferred embodiment illustrated in the attached drawing figures, it is noted that substitutions may be made and equivalents employed herein without departing from the scope of the invention as recited in the claims.

We claim:

1. An arm assembly for permitting releasable interconnection of a mobile patient transfer device and a separate support stand, wherein the transfer device presents a frame element, and the support stand includes a wheeled base and an upright standard secured to the base, the arm assembly comprising:

an articulating arm for interconnection of the transfer device with the stand, the arm having first and second axial ends that are movable relative to one another in any direction to permit movement of the stand relative to the transfer device when the stand is interconnected with the transfer device by the arm;

a coupling means for coupling the first end of the articulating arm to the support stand, the coupling means being formed of a clamp that is attached to the arm and includes a recessed area for receiving the standard and a means for maintaining the standard within the recessed area; and an attachment means for attaching the second end of the articulating arm to the frame element of the transfer device, the attachment means including a first attachment element configured to be secured to the frame element of the transfer device and a second attachment element secured to the second end of the articulating arm, the first and second attachment elements being detachable from one another to permit removal of the arm and coupling means from the transfer device.

2. An arm assembly as recited in claim 1, wherein the means for maintaining the standard within the recessed area includes a threaded, rotatable clamping screw having a first end extending into the recessed area and a second end accessible for manipulation.

3. An arm assembly as recited in claim 1, wherein the first attachment element includes a male coupling member presenting a circumferential groove, and the second attachment element includes a female coupling member including a receptacle sized for receipt of the male coupling member, and an axially shiftable collar for locking the second end of the articulating arm to the frame element of the transfer device, and for selectively releasing the second end of the articulating arm from the frame element.

4. An arm assembly as recited in claim 1, wherein the first attachment element includes a male coupling member presenting a circumferential groove, and the second attachment element includes a female coupling member including a receptacle having a closed end and sized for receipt of the male coupling member, and an axially shiftable collar for locking the second end of the articulating arm to the frame element of the transfer device, and selectively releasing the second end of the articulating arm from the frame element.

5. A mobile support stand for use in supporting a piece of equipment next to a patient transfer device, the stand comprising:

a wheeled base;

an upright standard secured to the base, and including a means for supporting the piece of equipment; and an arm assembly secured to the stand, the arm assembly including an articulating arm for interconnection of the transfer device with the stand, the arm having first and second axial ends that are movable relative to one another in any direction to permit movement of the stand relative to the transfer device when the stand is interconnected with the transfer device by the arm, the first end being secured to the stand and the second end including an attachment means for attaching the arm to the transfer device, the attachment means including a first attachment element configured to be secured to the transfer device and a second attachment element secured to the second end of the articulating arm, the first and second attachment elements being detachable from one another to permit removal of the arm and coupling means from the transfer device.

6. A mobile support stand as recited in claim 5, wherein the first attachment element includes a male coupling member presenting a circumferential groove, and the second attachment element includes a female coupling member including a receptacle sized for the receipt of the male coupling member, and an axially shiftable collar for locking the second end of the articulating arm to the frame element of the transfer device, and for selectively releasing the second end of the articulating arm from the frame element.

7. A mobile support stand as recited in claim 5, wherein the first attachment element includes a male coupling member presenting a circumferential groove, and the second attachment element includes a female coupling member including a receptacle having a closed end and sized for the receipt of the male coupling member, and an axially shiftable collar for locking the second end of the articulating arm to the frame element of the transfer device, and selectively releasing the second end of the articulating arm from the frame element.

* * * * *